(12) United States Patent
Pregasen et al.

(10) Patent No.: US 10,706,215 B2
(45) Date of Patent: Jul. 7, 2020

(54) PRODUCING FORMULA REPRESENTATIONS OF MATHEMATICAL TEXT

(71) Applicant: Parsegon, Ococee, FL (US)

(72) Inventors: Mathew Pregasen, Ocoee, FL (US); Rikhav Shah, Altamonte Springs, FL (US)

(73) Assignee: Parsegon, Ocobee, FL (US)

( * ) Notice: Subject to any disclaimer, the term of this patent is extended or adjusted under 35 U.S.C. 154(b) by 49 days.

(21) Appl. No.: 15/945,020

(22) Filed: Apr. 4, 2018

(65) Prior Publication Data

US 2018/0293211 A1    Oct. 11, 2018

Related U.S. Application Data

(60) Provisional application No. 62/481,877, filed on Apr. 5, 2017.

(51) Int. Cl.
*G06F 40/111* (2020.01)
*G06F 40/14* (2020.01)
*G06F 40/211* (2020.01)

(52) U.S. Cl.
CPC .......... *G06F 40/111* (2020.01); *G06F 40/14* (2020.01); *G06F 40/211* (2020.01)

(58) Field of Classification Search
CPC ... G06F 17/215; G06F 17/2247; G06F 17/271
See application file for complete search history.

(56) References Cited

U.S. PATENT DOCUMENTS 6,505,157 B1 *  1/2003  Elworthy ............. G06F 17/271
                                                                704/255
9,460,075 B2 * 10/2016  Mungi .................. G06F 17/271
(Continued)

OTHER PUBLICATIONS

Cervone et al., "Employing semantic analysis for enhanced accessibility features in MathJax," 2016 13th IEEE Annual Consumer Communications & Networking Conference (CCNC), Las Vegas, NV, Jan. 2016, pp. 1129-1134 (Year: 2016).*
(Continued)

*Primary Examiner* — Michelle M Koeth
(74) *Attorney, Agent, or Firm* — Perkins Coie LLP

(57) ABSTRACT

A formula system can transform a formula natural language representation ("NLR") into a representation which shows the formula in traditional mathematical notation. This transformation can include creating a state machine with transition mappings between states that match to initial parts of the NLR. These transition mappings can include global transition mappings that are first attempted to be matched to the beginning of the NLR and then state specific transition mappings can be matched to the NLR. The formula system can consume the NLR, transitioning from state to state as indicated by the transition mappings and removing the matched initial part from the NLR, until the NLR has been fully consumed. In some cases, the formula system can recursively or iteratively create additional state machines to consume portions of the NLR. Some states provide a result (e.g. portion of a formula representation) which are combined to create the final formula representation.

16 Claims, 10 Drawing Sheets

(56) References Cited

U.S. PATENT DOCUMENTS

2013/0024487 A1* 1/2013 Yi .................. G06F 17/215
                                                    708/136
2016/0155440 A1* 6/2016 Nagao ............. G10L 15/193
                                                    704/256.4

OTHER PUBLICATIONS

Morris et. al, "Intelligent natural language interface for a signal processing system," in IEE Proceedings E—Computers and Digital Techniques, vol. 137, No. 5, pp. 371-379, Sep. 1990 (Year: 1990).*

* cited by examiner

PRODUCING FORMULA REPRESENTATIONS OF MATHEMATICAL TEXT

CROSS-REFERENCE TO RELATED APPLICATIONS

This application claims priority to U.S. Provisional Patent Application No. 62/481,877, titled "Method of Producing Mathematical Text," which is herein incorporated by reference in its entirety.

TECHNICAL FIELD

The present disclosure is directed to using a digital state machine to transform a natural language representation of a formula into a representation that uses mathematical notation when rendered.

BACKGROUND

Digital mathematical notation is a field that was developed through the 1980s to facilitate the creation and transaction of mathematical models on a computer through a computer friendly format. This field is integral to professions in the academic, scientific, and financial professional sector. All competitive models, however, rely on creating a user interface that has a pseudo keyboard layout to prompt the user to build the equation either by "dragging and dropping" content or by clicking on mathematical formulae digital buttons and replacing any derivative fields (i.e. a formula creation wizard). An examples of the formula creation wizard method famously includes Microsoft Word's Equation Macro.

There are multiple shortcomings to the formula creation wizard approach. Users must context switch from keyboard input to utilizing a mouse or touchpad to move the digital cursor to create the mathematical formula, a slow and inefficient process. This impacts the ability for individuals in mathematics-relevant sectors to execute their intended equations quickly on any integrated interface. This has particular impacts in the education sector where math is ever-present and effective note-taking must be performed quickly. The relative slowness of contemporary formula creation wizard models for inputting math onto the computer makes the manipulation of formulas both difficult and unnatural for end users.

There is one method, however, that allows sole use of the keyboard for writing mathematical structures. This model is known as LaTeX, which is derived from the TeX language developed by Donald Knuth and is maintained by The TeX Users Group (TUG). However, there are multiple shortcomings to this approach that rival those of drag and drop or click and build equation interfaces. For example, users must first learn the LaTeX language, which can involve reading a handbook and being aware of sub-practices such as compiling, mark-up syntax, and package inclusion. LaTeX is solely a programming language and therefore is not admissible as a spoken or easily teachable natural language. Further, the user must download or utilize a LaTeX converter and requires time and technical expertise to set up the digital "architecture" of the LaTeX document. In addition, a LaTeX document has the shortcoming of being unreadable by the casual user, prohibiting users that are not devout on learning the language or downloading a compiler. These shortcomings of LaTeX are especially pertinent in the educational sector, where students are not yet at a technical level of mathematics that would be equivalent to learning a full markup language such as LaTeX.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
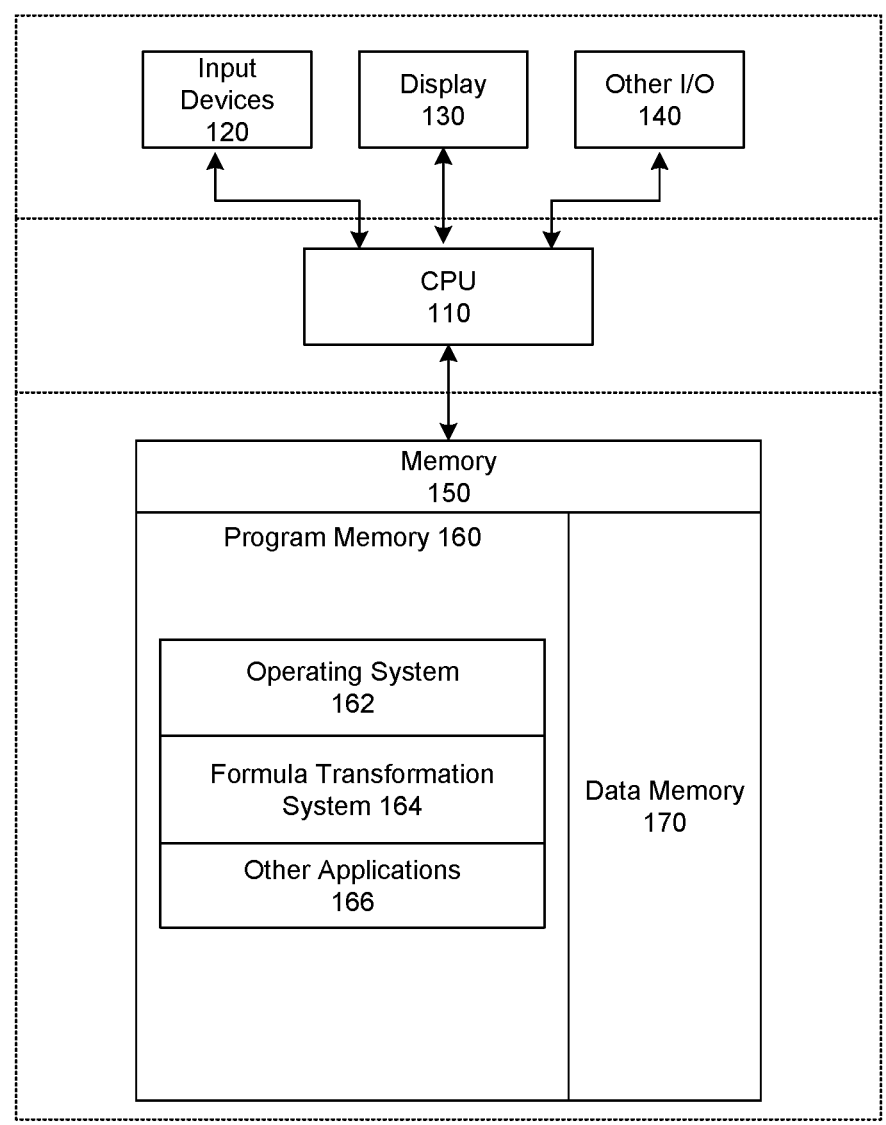
FIG. 1 is a block diagram illustrating an overview of devices on which some implementations can operate.

Embodiments of a formula system are described herein that can transform a natural language representation of a formula (referred to herein as a "NLR") into a formula representation. A "natural language" as used herein is a language spoken or written by humans, as opposed to a programming language or a machine language. (See the Microsoft Computer Dictionary, 5th Edition.) A formula representation is a representation of a formula that, when rendered, is provided in traditional mathematical notation. The formula system allows a user to easily obtain a formula representation by entering a NLR version of the formula, e.g. through a keyboard (e.g. a physical external device or a digital on-screen keyboard), through spoken words (e.g. entered through a microphone), through text recognition of handwriting or a document, etc. For example, a user can enter "an integral from 0 to 100 of x squared" and the formula system can automatically produce a formula representation of: $\int_0^{100} x^2 \, dx$.

The formula system can perform this transformation by creating a state machine that has transition mappings between states that can match to parts of a NLR. In some implementations, the formula system first attempts to match an initial part of the NLR to a set of transition mappings local to a current state of the state machine, and if no matches are found, to state specific transition mappings that are global to multiple of the states of the state machine. The formula system can consume the NLR, transitioning from state to state as indicated by the mappings and removing the matched initial part from the NLR, until the NLR has been fully processed. In some cases, as part of operating a current state, the formula system can recursively or iteratively create additional state machines to consume portions of the NLR associated with that state. Each state can provide a result (e.g. a portion of a formula representation) or context for other states. Results from the various states and state machines can be combined to create the final formula representation. In various implementations, the formula representation can be an image, a markup-language version of the formula (e.g. in HTML or XML) with a set of instructions (e.g. CSS) for displaying the markup-language version as a formula (e.g. in a browser), a block of LaTeX markup (which can later be rendered either using LaTeX or through a further conversion, e.g. to HTML/CSS, for rendering, or another data object that is configured to output a formula representation (e.g. input for a Microsoft Word macro that will create a formula object in the Word interface).

In some versions of the prior art, generating formula representations that use traditional mathematical notation is slow due to the need to use multiple input devices and context switches to a formula creation wizard, which can be difficult and slow. In the other versions of the prior art, entering a formula can be a cryptic process of entering a programming language representation of the formula. Such prior art systems for pure keyboard entry of formulas have a high barrier to entry as they require special training and programming architecture while also being error prone, as users have to convert what they want to show to the unnatural programming language format, increasing the cognitive burden. The formula system disclosed herein provides a technical improvement over these systems to make formula entry fast though a single input device while increasing accuracy by using natural language input. These improvements are realized by implementing the computing procedures described below that transform natural language representations of a formula into a formula representation that shows traditional mathematical notation. This formula system is the first capable of utilizing natural language input as the sole form of entry to form mathematical equations, eliminating the delay of using a formula creation wizard while also eliminating the need for user entry of complicated and error-prone programming or mark-up language.

Several implementations are discussed below in more detail in reference to the figures. FIG. 1 is a block diagram illustrating an overview of devices on which some implementations of the disclosed technology can operate. The devices can comprise hardware components of a device 100 that can convert a natural language representation of a formula into a formula representation. Device 100 can include one or more input devices 120 that provide input to the CPU(s) (processor) 110, notifying it of actions. The actions can be mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, formula transformation system 164, and other application programs 166. Memory 150 can also include data memory 170 that can include transition mappings, stored results from visited states of a state machine, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
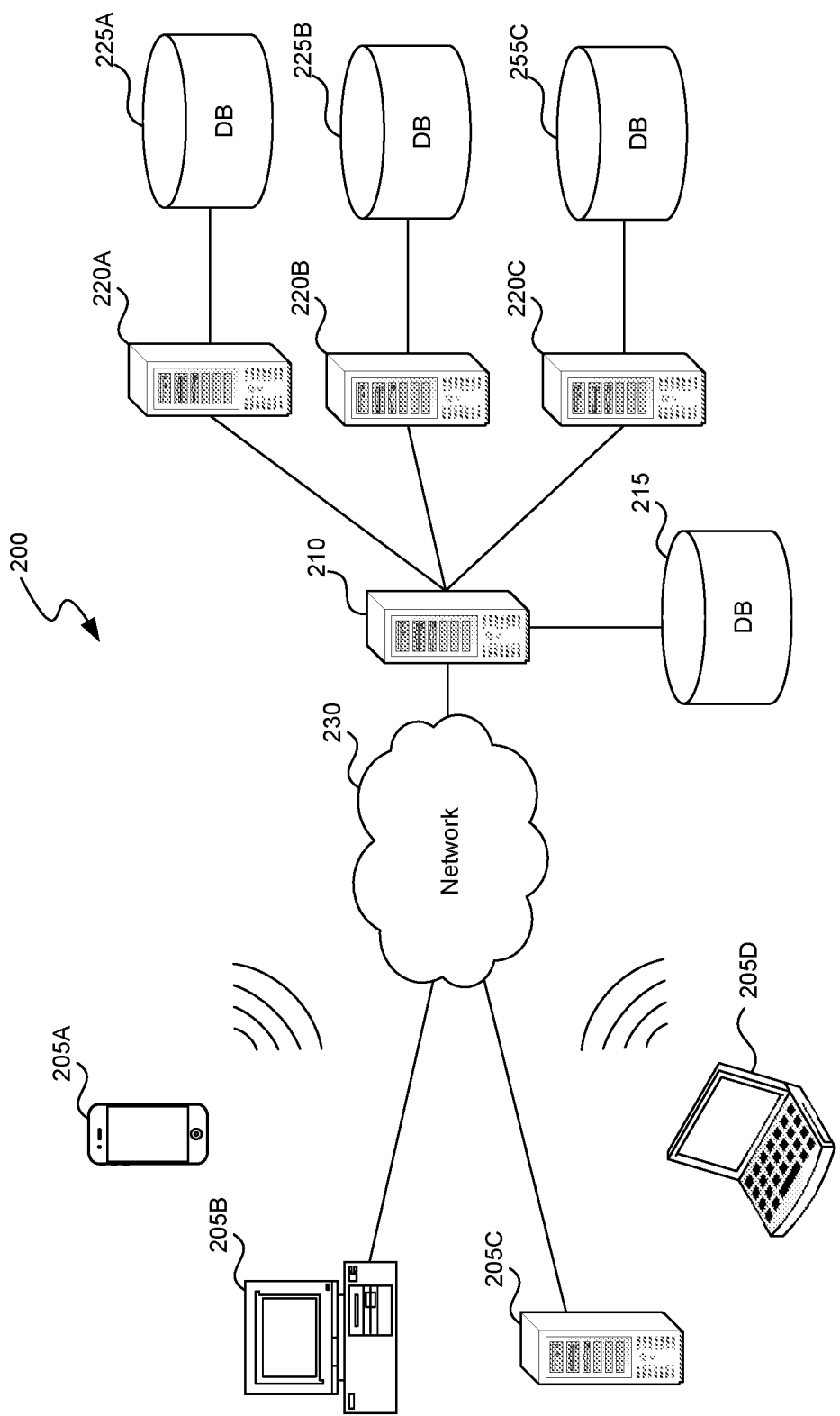
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
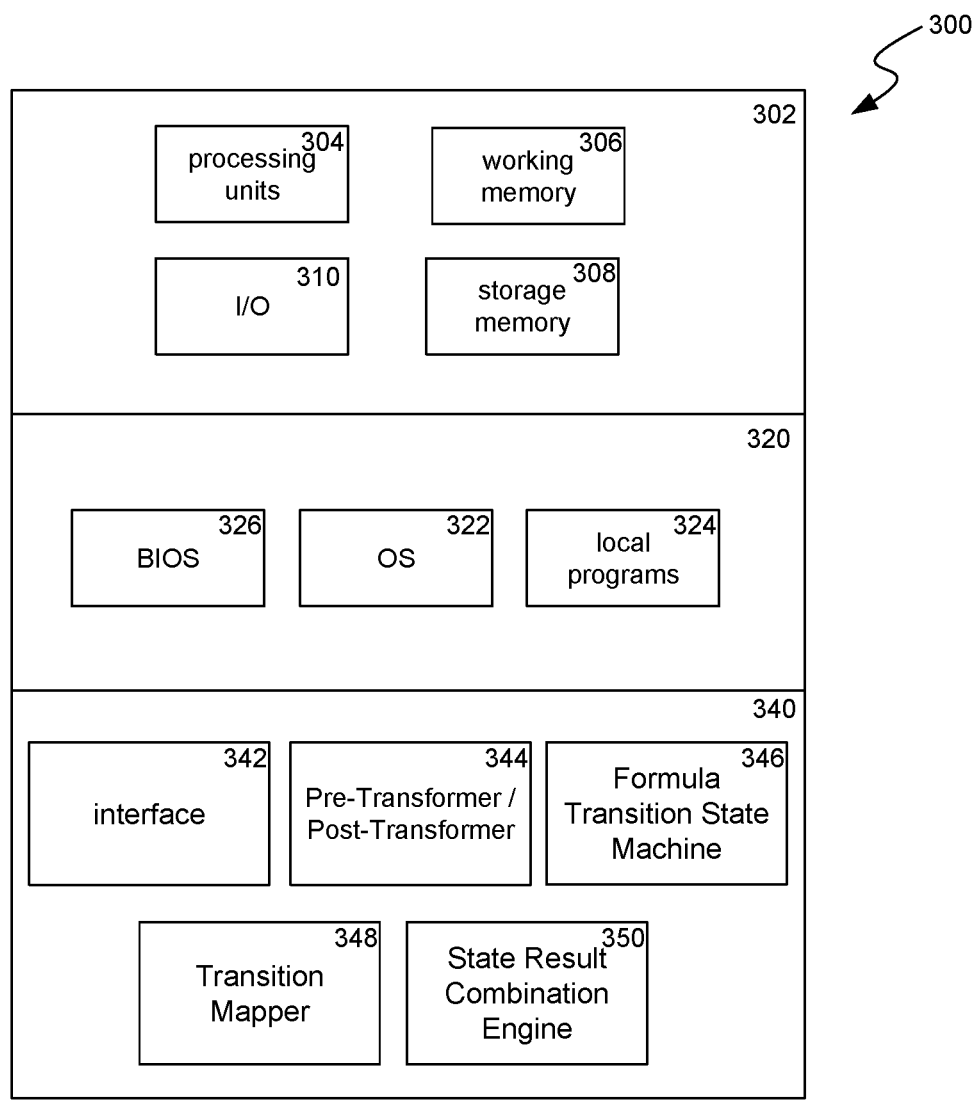
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include pre-transformer and post-transformer 344, formula transition state machine 346, transition mapper 348, state result combination engine 350, and components which can be used for providing user interfaces, transferring data, and controlling the specialized components, such as interface 342. In some implementations, components 300 can be in a computing system that is distributed across multiple computing devices or can be an interface to a server-based application executing one or more of specialized components 340.

Pre-transformer and post-transformer 344 can adjust an input NLR, e.g. by removing unnecessary words such as "the" or converting certain phrases to phrases used in transitions between states of state machine 346. Pre-transformer and post-transformer 344 can also adjust formula results, such as by removing unnecessary parentheses, associating a CSS script to a HTML block or adding CSS inline to such a HTML block, or converting a formula representation into an image.

Formula transition state machine 346 can include a state machine (e.g. implemented as a set of extensions to a state class) that tracks which state is the current state, where entering and exiting each state can produce state results. State results, for example, can include filling in a template for the current state with a portion of a natural language representation of a formula that was passed to the state. In some implementations, evaluating a state can include recursively implementing a new version of transition state machine 346 to process sub-strings of the natural language representation.

Transition mapper 348 can control which state is transitioned to next, from the current state. Transition mapper 348 can select a next state by matching an initial portion of the natural language representation of a formula to a transition mapping. In various cases, the match can be made to one of a set of global transition mappings or to one of a set of transition mappings specific to the current state. Each transition mapping can have a pattern portion specifying a pattern to match to the begging of the natural language representation and can have a mapping destination, specifying a state for formula transition state machine 346 to transition to next.

State result combination engine 350 can take stored results, generated from various states, and combine them into an overall state result for a particular state or the state machine. This combining can include, for example, concatenation of state results.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
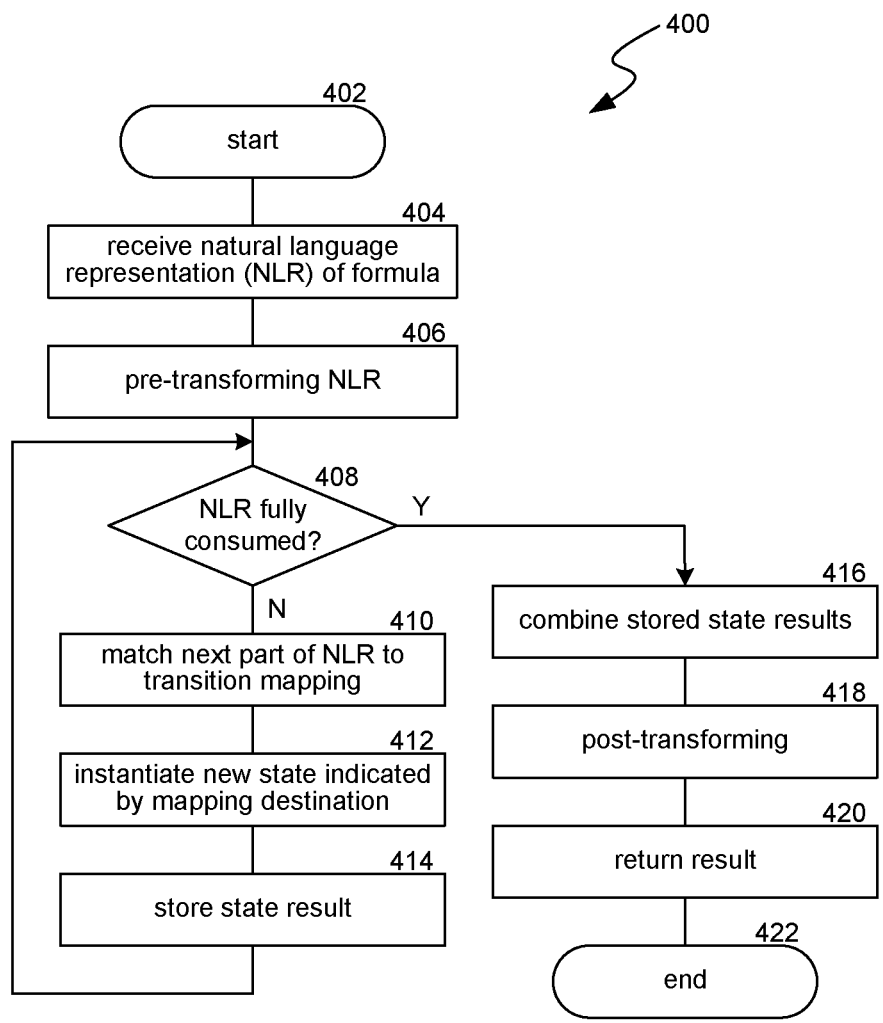
FIG. 4 is a flow diagram illustrating a process used in some implementations for transforming a natural language representation of a formula into a formula representation.

FIG. 4 is a flow diagram illustrating a process 400 used in some implementations for transforming a natural language representation of a formula into a formula representation. Process 400 begins at block 402 and continues to block 404. At block 404, process 400 can receive a natural language representation of a formula (NLR). In various implementations, this NLR can be input through a keyboard, microphone, handwriting, extraction from a document, etc. In some implementations, as a user enters natural language into an interface (e.g. a word processing system, browser-based or other online application, mobile app, or other system that receives natural language) process 400 can be automatically re-executed continuously or at intervals, analyzing and converting sections of user input. In some implementations, process 400 can recognize keywords or phrases to select a portion of the input as a NLR on which to initiate the remainder of process 400. In some implementations, the user can indicate that process 400 should be performed on a recent or a selected portion of input, e.g. by actuating a digital "convert" button that instructs the application to convert the NLR to a formula representation. In some implementations, a combination of these procedures is used. For example, the system can monitor for key phrases in entered text, and upon recognizing one, can show a context tool near the phrase, the actuation of which initiates process 400 with a NLR related to the key phrase. Key phrases, for example, can include words (e.g. integral, exponent, matrix, formula, equation, etc.) or characters (e.g. +, −, ^, *, ect.).

At block 406, process 400 can perform pre-transformation procedures on the NLR. Pre-transforming can take various forms such as removing unnecessary words, converting equivalent words to a common format, or adding or removing likely spacing or structural marks. For example, pre-transforming can convert each of "to the," "take the exponent," "take a power of" and other ways of indicating exponent to the common symbol "^". As another example, pre-transforming can remove all instances of "the" except where it is part of the phrase "to the," indicating exponentiation. As a further example, the NLR 1+2 can be converted to 1+2, so consistent spacing is used. In some implementations, pre-transforming can include adding a particular "start of string" indicator to the beginning of the NLR or adding a particular "end of string" indicator to the end of the NLR.

At block 408, process 400 can begin a loop between blocks 408-414, which will process the NLR until it has been fully consumed (i.e. all parts of the NLR have been processed). When the NLR has been fully consumed, process 400 continues from block 408 to block 416. When at least a part of the NLR has not been consumed, process 400 continues from block 408 to block 410. If this is the first time process 400 has arrived at block 408, process 400 can also initialize a state machine that will control processing in the loop between blocks 408-414. In various implementations, the state machine can be a traditional state machine (e.g. a data object with a preconfigured set of state variables) or can be another digital object that stores mappings between contexts and produces a result corresponding to a portion of the NLR that corresponds to the digital object (e.g. a state class with a hierarchy of class extensions defining characteristics of the various states, which can be constructed as a state is entered).

At block 410, process 400 can match part of the NLR to a transition mapping. Transition mappings can have a pattern portion that can be matched to part of a NLR and a mapping destination portion indicating a next state that process 400 should go to. In some implementations, the mapping destination can be variable depending on a context produced by the state or by other states, as discussed below in relation to block 412. The state machine can include a set of global transition mappings and each state can have zero or more state-specific transition mappings. In some implementations, the set of global transition mappings and each set of state-specific transition mappings can have an order, either within that set or across both sets. Process 400 can match an initial portion of the NLR (from the start of the NLR to any remaining amount of the NLR up to the entire NLR) to one of the patterns in a transition mapping. In some implementations, one of the sets of mappings can include a default mapping indicating a mapping destination if no other match can be found for the initial portion of the NLR. In various implementations, the pattern can be a string for comparison (with or without wildcards) or can be a more complicated object, such as a regular expression. In some implementations, a global transition mapping can be for a start of string indicator, with a mapping destination pointing to a first state of the state machine. In some cases, when a portion of the NLR is matched, it is removed from the NLR for further processing of the loop between blocks 408-414.

Mappings can be for any group of numbers, characters, or other symbols, allowing the NLR to be provided by the user and matched using a combination of how a formula would be spoken and symbolic representations. For example, "x squared over y plus a/b−(2^3)/6" can be successfully matched to state transitions, even though the second half is not written in a way that a person is likely to speak (i.e. they are more likely to say "a over b" instead of "a slash b". In some implementations, the mappings can include LaTeX commands as the keywords/phrases pattern portion. For example, "\infty"—the LaTeX command for the infinity symbol—can be included as a mapping to the "infinity" state. This would allow users to write an NLR, for example, "limit as x approaches \infty of (4x−2)/(2x+1) equals 2," which can be successfully converted to a formula representation with an ∞ symbol. In addition, some implementations the system can successfully convert arbitrary LaTeX math statements in the NLR to the formula representation. This can be accomplished by setting a global mapping that recognizes a starting delimiter (e.g. "\(" or "$$") and uses a separate LaTeX interpreter to parse the text up until the ending delimiter (e.g. "\)" or another "$$"). Additional details regarding matching an part of the NLR to a transition mapping are provided in relation to FIG. 5.

At block 412, process 400 can initiate a new state indicated by the mapping destination of the transition mapping matched at block 410. Initiating a new state can include transitioning to a state in the state machine. In some implementations, initiating a new state can include a series of state start actions that can produce context for performing other actions of the state or of other states and/or can produce state results, such as a portion of output representing the formula (e.g. a block of HTML). For example, initiating a new state can be done by creating a new object that is an extension of a state class with a constructor function that receives the matched part of the NLR and/or some remaining portion of the NLR as a parameter. Which state extension is uses is controlled by the mapping destination. The constructor can call a function for generating HTML from the NLR that will transform the received text into corresponding HTML, e.g. by extracting portions from the NLR and inserting them into one or more HTML templates defined for the state extension. Entering a state can also produce context for other states, e.g. by pushing data onto a stack (or other data object) that is available to other states. This data object can control the operation of, or transition between, the various states, such as by selecting a particular state transition when a transition mapping has variable possible destinations. For example, with the NLR "integral of cosine of x plus sine of x", when each of the "integrand", "cosine", and "sine" states are entered, an indicator of this state can be pushed onto a stack. When the state completes, it looks at the state to determine which state to return to. Thus, when the "cosine" state returns the state machine can transition to the "integrand" state, causing the results of the "cosine" state in be in the integrand, even though there is no word in the NLR input prompting the system make this return transition.

In some implementations, initiating a new state can include a recursive call to process 400 to generate output corresponding to sub-parts of the received NLR portion. In some implementations, when the received portion of the NLR has been processed, the state extension can include a destructor that can provide additional context, remove context added by the constructor, or provide additional output (e.g. additional HTML blocks). In some implementations, constructing or destructing a state can cause symbols that were not typed by the user to be included in the state results. For example, "wrt x" can become "dx" when rendered even though a 'd' was never typed. In some implementations, this is accomplished by adding the additional symbols to results of sub-states, e.g. the character 'd' can be added to the value (e.g. "x") returned by instantiating a 'wrt' state to end up with <wrt>dx</wrt>. In some implementations, this can be accomplished in a rendering step where the wrt tag adds a 'd' to its body.

In some cases, a state can apply one of multiple templates associated with the state. For example "integral from 0 to 1 of x wrt x" and "integral with bounds 0 and 1 of x wrt x" produce the same output, but the former uses the template "integral symbol, lower bound, upper bound, integrand, wrt" and the latter the template "integral symbol, bounds, integrand, wrt" where the "bounds" state itself has a template of "lower bound, upper bound". The integral state can detect which template to use given the input. This allows the algorithm to support a wider range of NLRs for the same math expression. Further details regarding initiate a new state based on a mapping destination are provided in relation to FIG. 6. At block 414, the state results from block 412 can be stored for later combination into an overall representation of the formula.

Once the loop between blocks 408-414 has consumed the entire NLR, processing continues to block 416. At block 416, process 400 can combine the results stored at block 414. In some implementations, some or all of the results can be typed to indicate how the combination will occur, with each type specifying a procedure for making the combination. For example, a result can specify a division type which can indicate a procedure for selecting particular stored results to include in a numerator portion and other particular stored results to include in a denominator portion. In some implementations, untyped results can be combined using a default procedure, such as concatenation.

At block 418, process 400 can perform various post-transforming procedures such as removing unnecessary parentheses, imbedding CSS into HTML, or converting the combined result into an image. For example, if the text input was (a+b)/2, the combination of results from block 416 might be equivalent to:

$$\frac{(a+b)}{2}.$$

However, due to the mathematical notation, the parentheses are no longer needed, so the post-transforming can convert this to:

$$\frac{a+b}{2}.$$

As another example, process 400 can take a block of HTML from block 416, apply CSS to render a result, and take a snapshot of the result as an image. At block 420, process 420 can return a result of the transforming. For example, the result can be a block of XML, HTML, an image, etc. Process 400 can then continue to block 422, where it ends.

Figure 5:
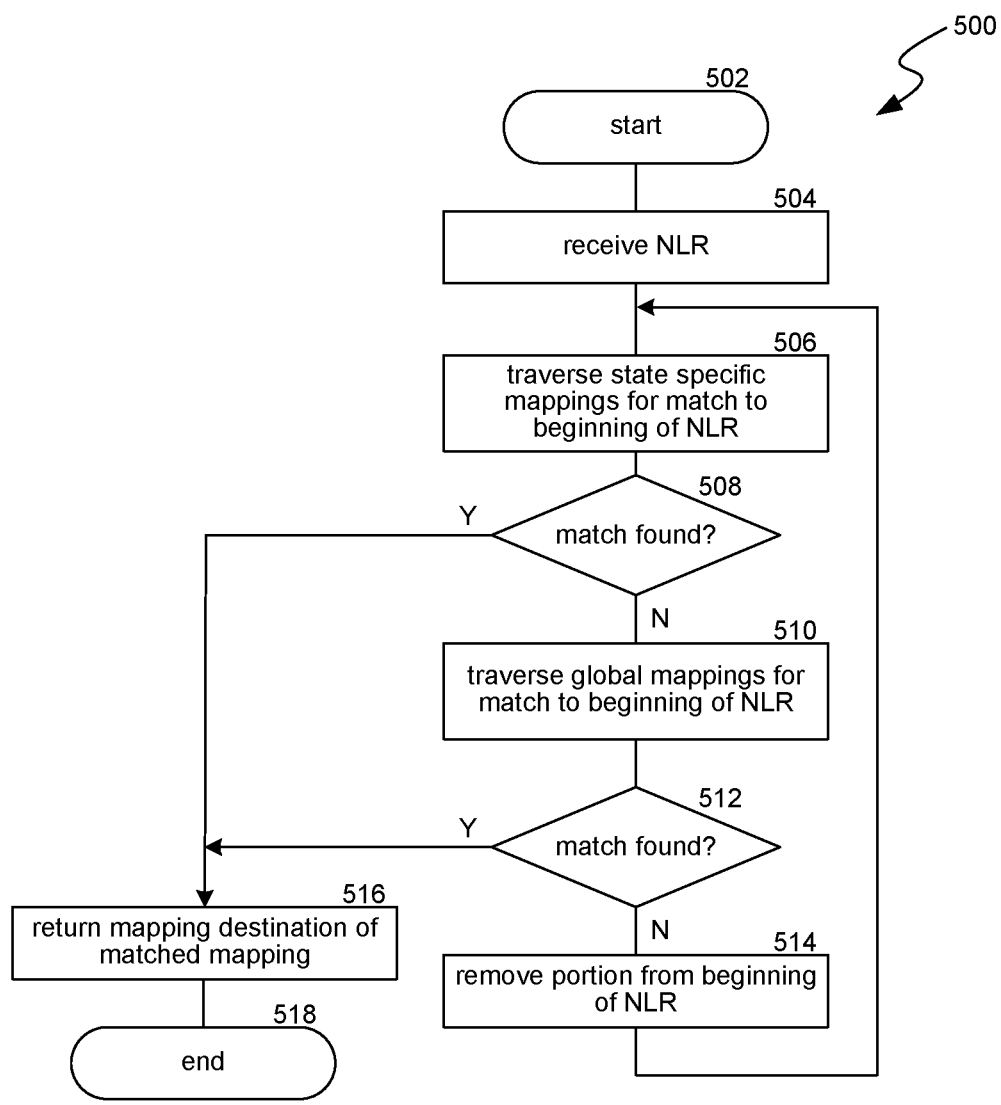
FIG. 5 is a flow diagram illustrating a process used in some implementations for matching a part of a natural language representation of a formula to a state transition mapping.

FIG. 5 is a flow diagram illustrating a process 500 used in some implementations for matching a part of a natural language representation of a formula to a state transition mapping. In some implementations, process 500 can be initiated by process 400 at block 410. Process 500 begins at block 502 and continues to block 504. At block 504, process 500 can receive a NLR.

At block 506, process 500 can traverse any state specific mappings that are assigned to the current state initiated at block 412 (or the first state of the state machine). In some implementations, the state specific mappings can be ordered, in which case the traversal of the state specific transition mappings can be performed in the order. This traversal can include determining if a beginning portion of the NLR matches a pattern portion of any of the state specific transition mappings. The pattern portion of a transition mapping can be anything that can be compared to a string, such as an exact string, a string with wildcards, a regular expression, etc. The beginning portion of the NLR can be any amount of the NLR that starts from a first character of the NLR.

At block 508, if a match to a state specific transition mapping was found at block 506, process 500 continues to block 516. Otherwise, process 500 continues to block 510. At block 510, process 500 can traverse a set of global transition mappings to determine if any global transition mapping match the initial portion of the NLR. This traversal can be accomplished in a manner similar to that described for block 506. The global transition mappings can be for portions of mathematical notations that can occur independently of previous portions of a formula, and thus do not require context or processing from a previously entered state to correctly produce a function representation. For example, if a user entered "x^3/y" and the "x" portion had already been processed and removed, so the remaining part of the NLR is "^3/y", one of the global transition mappings can include a pattern that matches the initial NLR portion "^", causing this transition mapping to be selected in the traversal. Examples of global transition mappings include global mappings in three categories: (1) special functions, (2) symbols, and (3) modifiers. Examples of special functions can include: "integral", "log"; "^"; "limit"; "square root"; "absolute value"; "floor"; "boldface"; and "blackboard", where boldface and blackboard are special commands to change the font of the next word or letter typed. For example, "blackboard Z" can specify the symbol for a set of integers. Examples of symbols can include: "alpha", "dot", or "parens". Example of modifiers can include: "bar" (e.g. "x bar" is an x with a bar over it), "tilde", "hat", and "-dot" (the hyphen can be used here to avoid ambiguity with a dot symbol next to a character usually denoting multiplication). In some implementations, the global mappings can be ordered, in which case the traversal of the global transition mappings can be performed in the order.

In some implementations, a default state or default processes can be selected if the beginning of the NLR does not match any of the global or state specific transition mappings. For example, an empty NLR can cause process 500 to return with an indication that the current state should return its stored results. Alternatively, if no match to a global transition mapping if found, at block 512, process 500 can go to block 514 to take a default action. If a match is found, process 500 can continue to block 516.

At block 514, no global or state specific transition mapping has been found. In response, process 500 can modify the NLR by removing a beginning portion from the NLR. In various implementations, the removed portion can be the first character or first word of the NLR. Process 500 can then return to block 506 to again attempt to match the now modified NLR to the global transition mappings, and if no global match is found, to the state specific transition mappings at block 510.

Once a match has been found, at block 516, process 500 can return a mapping destination from the matched transition mapping. Each transition mapping can refer to a mapping destination, which identifies a next state to transition to from the current state. For example, if the current state is a state for an integral, and the matched transition mapping is a close_integral state, which has been matched to the NLR "with respect to x" process 500 can return an indication of the close integral state, which can cause process 400 to generate and transition to the close_integral state at block 412. Process 500 can the proceed to block 518, where it ends.

Figure 6:
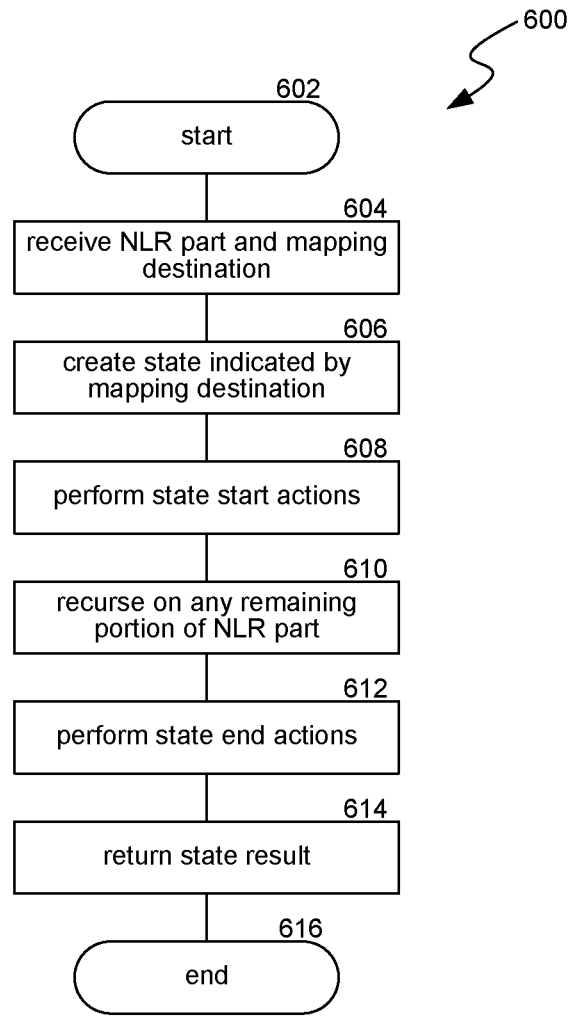
FIG. 6 is a flow diagram illustrating a process used in some implementations for instantiating a new state indicated by a transition mapping destination.

FIG. 6 is a flow diagram illustrating a process 600 used in some implementations for instantiating a new state indicated by a transition mapping destination. In some implementations, process 600 can be initiated by process 400 at block 412. Process 600 begins at block 602 and continues to block 604. At block 604, process 600 can receive part of a NLR and a mapping destination. In some implementations, the NLR part can be a part of a NLR that was matched to a pattern of a transition mapping at block 506 or 510 and the mapping destination can be the mapping destination returned based on that match at block 516. In some implementations, the NLR part can also include a portion of the NLR after the matched portion that is also before a next match in the NLR. For example, when the current state is an integral state, and the NLR is "from −100 to 100 of x^3 dx" a match is for the word "from" can indicate that the next state is a lower bound state, and a next match can be for the word "to", between these is the substring "−100" which can be the NLR part that is passed to process 600. In some implementations, the NLR part can be the remainder of the string, e.g. "−100 to 100 of x^3 dx", the initial part including "−100" can be matched at block 410 to a new expression, the result of which can be determined at block 610 and included in output defining the integral lower bound, as discussed below.

At block 606, process 600 can create the state indicated by the mapping destination. This can be accomplished by calling a constructor function corresponding to the mapping destination of an object that extends a state class. In some implementations, instead of creating a new state, the state machine can be fully formed, and process 600 transitions to the indicated mapping destination state, e.g. by updating a pointer to the corresponding state. At block 608, process 600 can perform actions that the new state indicates should occur when the state is first entered. For example, state start actions can include pushing items onto a context stack (or augmenting another context data structure) or filling in a template corresponding to the state. In some implementations, a template corresponding to a state can be a snippet of structured data that will form part of the formula representation output from process 400. As a more specific example, if the new state is an integral state, the template can be the XML snippet, e.g. "<integral>". In some implementations, performing state start actions can modify the NLR part to remove portions corresponding to formula sections added through the template. For example, if the NLR part was "integral from 0 to 10 of 2x" performing the state start actions can include causing "integral" (i.e. the portion of the NLR matched at block 510) to be removed from the NLR part.

At block 610, process 600 can recurse on any remaining portion of the NLR part received at block 604. In some implementations, recursion on a NLR portion can include calling a new instance of process 400 on the remaining portion. Continuing the previous example, the remaining portion of the NLR could be "from 0 to 10 of 2x". This recursion can first determine a state specific transition matching (at block 510) from the integral state to a "from" state when performing the matching of "from 0" that adds (at blocks 608 and 612) template "<from>0</from>". The "from" state would then return to the parent integral state. This recursion can next determine a state specific transition matching (at block 510) from the integral state to a "to" state when performing the matching of "to 10". The "to" state can add (at blocks 608 and 612) a template "<to>10</to>" and then can returns to the parent integral state. This recursion can next determine a global transition matching (at block 506) from the integral state to a multiplication state when performing the matching of "2x". The multiplication state can add (at block 608) a template "<expression>2x</expression>" and then return to the parent integral state. This is a simplified example, as in some implementations, further recursion would have been performed in each phase to create each expression. The state results from the recursion can be added to the template state results generated at block 608. In the previous example, upon exiting block 610, the state results are "<integral><from>0</from><to>10</to><expression>2x</expression>".

When the recursion of the remaining portion of the NLR is complete, process 600 continues to block 612 where any state end actions can be performed. Performing state end actions can include removing context created at block 608 (e.g. popping variables off a context stack). In some implementations, process 600 can identify that the recursion is complete by encountering a keyword or symbol closing a sub-portion of the NLR. For example, a common key symbol that indicates the end of a sub-portion is close parentheses. As a more specific example, the NLR "sin(" causes the state machine to enter a "sin-parens" state which is ended when ")" is read. In this case, the ")" is removed from the remaining NLR to be parsed. In other cases, that removal may not occur. For example, in the NLR "integral of x from 0 to 1", the word "from" triggers the end of the "integrand" state (and thus the return to the integral state), but the word "from" is not removed as it is needed so that the integral state knows to transition to a lower bound state.

Performing state end actions can also include filling in a template corresponding to exiting the state. In some implementations, an exit template corresponding to a state can be a snippet of structured data that will form part of the formula representation output of process 400. Continuing the previous example, the recursion on the NLR part has consumed the NLR part such that it is now empty. The state end actions can determine that an "integral end" state had not been entered during the processing of the integral state, and thus it can add a default "<WRT>x</WRT>" to the state results, where the "x" is identified as the primary variable in the expression portion of the integral result. Further state actions can add a closing template to the state results. Continuing the above example, "</integral>" can be the closing template for the integral state. Thus, upon leaving block 612 in this example, the state results are "<integral><from>0</from><to>10<110><expression>2x</expression><WRT>x</WRT></integral>". These state results are only an example, and other start and end state actions with corresponding templates could produce other state results, such as: "<integral from ='0' to ='10' WRT='x'><multiply><integer>2</integer><variable>x</variable></multiply></integral>". In this case, the recursive process of block 610 would have returned results which the state end actions would incorporate into the results of the current state, e.g. by filling in the "from='0'" parameter to the <integral>template.

In some implementations, performing state end actions can modify the NLR part to remove portions corresponding to formula sections added through the template. For example, if the NLR part had included the phrase "with respect to x" this portion could have been removed from the NLR part when it added "<WRT>x</WRT>" to the state results.

Once the state end results have been computed they can be returned or otherwise stored at block 614. Process 600 can then continue to block 616, where it ends.

Figure 7:
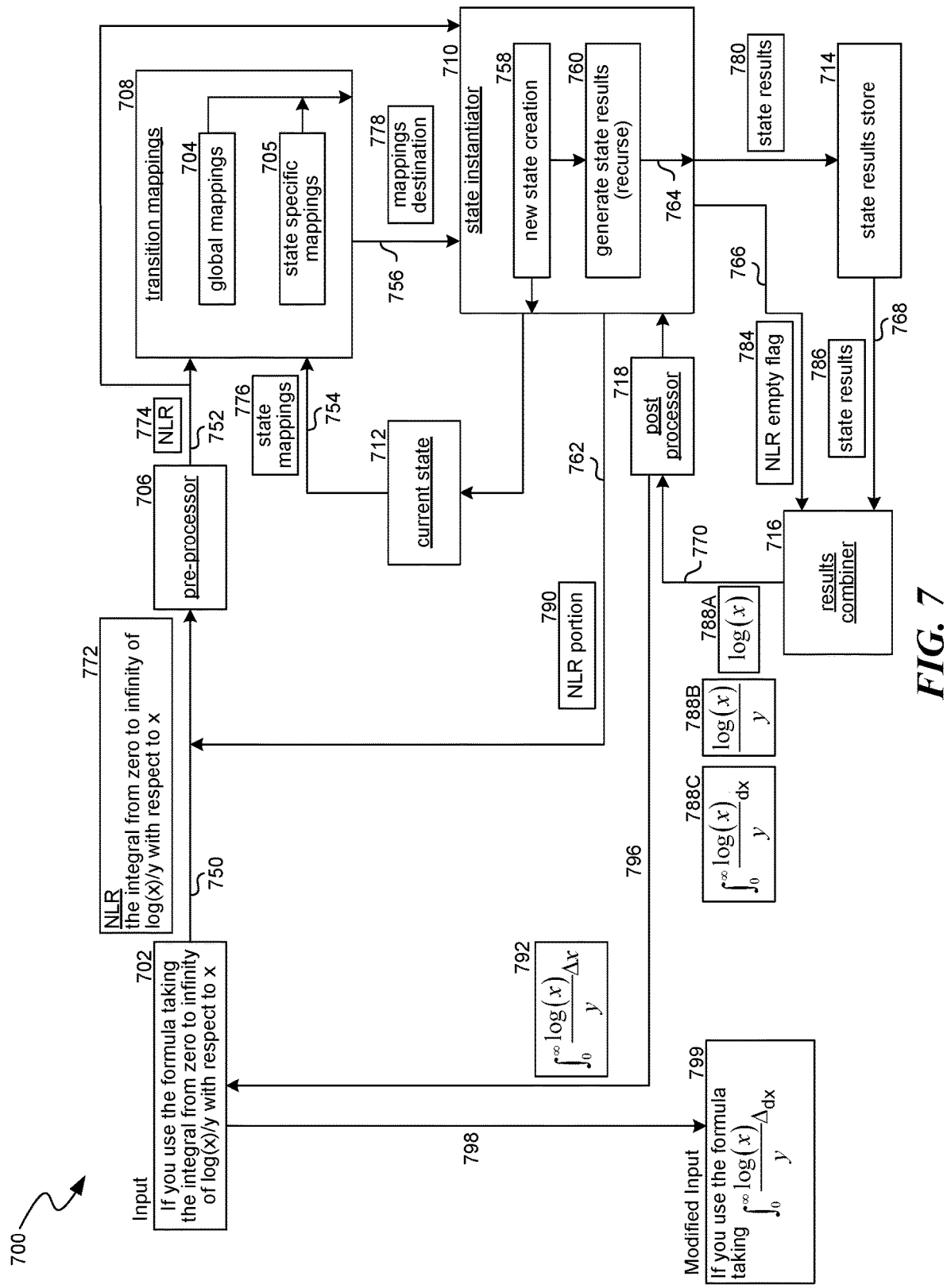
FIG. 7 is a conceptual diagram illustrating an example system that converts a natural language representation of a formula into a formula representation.

FIG. 7 is a conceptual diagram illustrating an example 700 system that converts a natural language representation of a formula into a formula representation. In example 700, a user is typing into a user interface and has entered the input 702 "If you use the formula integral from zero to infinity of log(x)/y with respect to x". In example 700, input is continuously analyzed for a formula and thus processing has, in previous iterations, disregarded "If you use the formula taking" as not being part of a mathematical notation. Also in previous processing, as the user has entered "integral from zero to infinity of log(x)/y with respect to x," the system can have created corresponding portions of a formula representation, e.g. when the user entered "integral" the system may have replaced it with ∫ and when the user entered "from zero to infinity" the system may have updated the representation to replaced it with $\int_0^\infty$, automatically as the user continued to type. Example 700 picks up at 750 where the user has completed entering the formula, and the NLR 772 including "the integral from zero to infinity of log(x)/y with respect to x" is passed to the pre-processor 706.

Pre-processor 706 can transform the NLR to remove unnecessary words or characters or perform replacements specified by a replacement dictionary. In example 700, NLR 772 is converted to remove "the" unless it is part of the phrase "to the" so that NLR 774 is "integral from zero to infinity of log(x)/y with respect to x". NLR 774, at step 752, is provided to transition mappings 708 and to state instantiator 710.

At step 754, a current state, with a set of state specific transition mappings, are provided to transition mappings 708. At this point, the current state is a default first state, instantiated in response to receiving a NLR to process.

Next, transition mappings 708 attempts to match an ordered set of global transition mappings to an initial part of NLR 774 and if no match is found, continues to match an ordered set of transition mappings from the current state to the initial part of the NLR 774. If still no match is found, transition mappings can take a default action, such as removing the first character from the NLR and trying again. When a match is found, a mapping destination 778 from the matched transition mapping is provided from transition mappings 708 to state instantiator 710. In this case, "integral" is matched to a state specific mapping with an integral state mapping destination 778.

Once a mapping destination 778 is found, state instantiator 710 can perform new state creation at 758, which can cause creation of state results dictated by a template corresponding to the new state and/or setting context for the state and later crated sub-states. This can also modify the NLR to remove processed portions. At this point in example 700, new state creation 758 creates an integral state, which produces states results of an XML block including "<integral>" and modifies the NLR to be NLR portion 790 which is "from zero to infinity of log(x)/y with respect to x". Recursion on the NLR portion happens at 760, as indicated by step 762. In each recursion, the state results 780 are stored in state results store 714. In some implementations, when the recursive call ends, additional results can be added to the results that were generated during state creation 758. For example, where the state creation results included an opening XML tag the state ending results can include a corresponding closing XML tag. When each recursion ends, the NLR that initiated the recursion will be empty as indicated at 766 by NLR empty flag 784, triggering a combination of the stored state by results combiner 716. Example 800 discussed below illustrates data produced during the recursive processing of the NLR. During the creation of these results, the stored results are combined in a first recursion to be an XML block 788A representing log(x). This XML block is combined in the closing of a previous recursive call to produce a second XML block 788B representing $$\frac{\log(x)}{y}.$$

This XML block is combined in the closing of the first call to state instantiator 710, to produce a final XML block 788C representing $$\int_0^\infty \frac{\log(x)}{y} dx.$$

Each of these blocks can be provided at 770 to post-processor 718 for final analysis, such as removing unnecessary parentheses, applying CSS, etc. When the initial NLR 772 has fully consumed and the combined state results have been passed through post processing 718, these results 792 can be provided at 796 back to replace the NLR in the input. The results can be incorporated at 798 into the rendered modified input 799.

Figure 8:
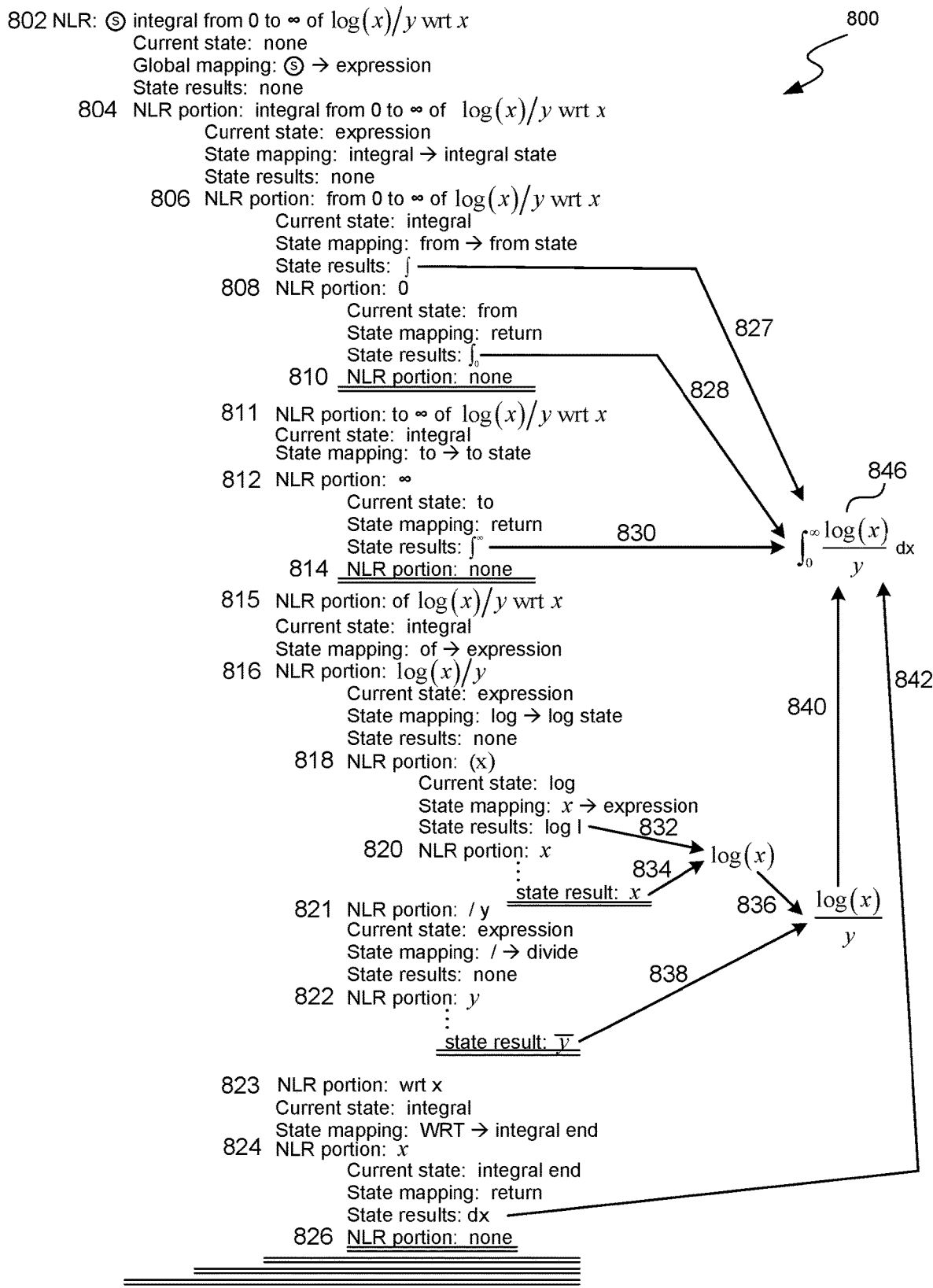
FIG. 8 is a conceptual diagram illustrating an example of state results during a transformation of a natural language representation of a formula into a formula representation.

FIG. 8 is a conceptual diagram illustrating an example 800 of state results during a transformation of a NLR into a formula representation. Example 800 begins when a received NLR 802 is "integral from 0 to ∞ of log(x)/y wrt x". Though this example uses the ∞ symbol for conciseness, in some cases other infinity indicators, such as the word "infinity" could be entered. In example 800, the NLR has been shown with a circled s symbol at the beginning, indicating a start of string character.

Processing of NLR 802 begins with no current state but a global transition mapping of a start of string character to an expression state indicates that the first state will be an expression state. The system, upon making this match, removes the start of string character from the NLR, resulting in NLR 804. Because there is no current state, there are no state results.

Processing of NLR 804 begins in current state: expression. The beginning of NLR portion 804 is matched with an expression state specific mapping that maps the word "integral" to an integral state. The system, upon making this match, removes "integral" from the NLR, resulting in NLR 806. In this case, moving from the start of string character to the expression state produced no state results. In some implementations, the expression state can produce results which may not produce renderable output but establishes context for other features, such as an HTML block <math class="expression">, which can have associated CSS elements or can establish a hierarchy that controls how other sub-blocks are rendered.

Processing of NLR 806 begins in current state: integral. Upon initializing the integral state, state results for an ∫ symbol are produced. While in FIG. 8 the state results are shown as they would eventually be rendered, the actual data in the state results can be other forms, such an HTML block. For example, the state results could be "<span class='integral'>", where corresponding CSS and/or javascript are later added to fill in spans with class integral with a particular integral image or character with spacing defined by the reminder of the integral, e.g. whether it has limits and the height of formula on which the integral is taken. Another example is an XML block "<expression type='integral'>222B", where 222B is the hexadecimal code for the integral character.

The beginning of NLR portion 806 is matched with a "from" state specific mapping that maps the word "from" to a from state. The system, upon making this match, removes "from" from the NLR and recurses on a substring that is between the matched "from" string to a next match of either a new expression start or, as in example 800, a "to" match, resulting in NLR 808.

Processing of NLR 808 begins in current state: from. Upon initializing the from state, state results for updating the ∫ symbol to include a 0 lower bound are produced. For example, the state results could be a flag to update the parent "<span class='integral'>" to be "<span class='integral' lowerBound='0'>". Another example is an XML block that could be included inside the XML block generated in the integral parent state with the content "<intLowerBound>0</intLowerBound>", where the 0 is taken from the NLR 808. In some implementations, evaluating NLR 808 would match the 0 to another expression state where the 0 would be the state result. After producing this state result, 0 would be removed from the NLR and it would be empty. This could cause the state transition mapping to be a return to the parent state, as indicated by the double lines under NLR portion 810.

Upon returning to the parent integral state, the remaining NLR portion 811, is processed, which excludes "from 0" removed in reaching the "from" state. Processing of NLR 811 begins in current state: integral. Returning to the integral state does not produce any new state results. The beginning of NLR portion 811 is matched with a "to" state specific mapping that maps the word "to" to a to state. The system, upon making this match, removes "to" from the NLR and recurses on a substring that is between the matched "to" string to a next match to a new expression start, resulting in NLR 812.

Processing of NLR 812 begins in current state: to. Upon initializing the "to" state, state results for updating the ∫ symbol to include an ∞ upper bound are produced. For example, the state results could be a flag to update the parent "<span class='integral' lowerBound='0' upperBound='∞'>". Another example is an HTML block that could be included inside the HTML block generated in the integral parent state with the content "<span class='integralUpperBound'>∞", where the ∞ is taken from the NLR 812. After producing this state result, ∞ would be removed from the NLR and it would be empty. This could cause the state transition mapping to be a return to the parent integral state, as indicated by the double lines under NLR portion 814. In each case, when a state exits, further state results can be created. For example, where the HTML block "<span class='integralUpperBound'>∞" is the state result created from entering the state, the closing tag "</span>" can be the additional state result created when exiting the state.

Upon returning to the parent integral state, the remaining NLR portion 815, is processed, which excludes "to ∞" removed in reaching the "to" state. Processing of NLR 815 begins in current state: integral. Returning to the integral state does not produce any new state results. The beginning of NLR portion 815 is matched with an "expression" state specific mapping that maps to the word "of" when in the integral state to an expression. The system, upon making this match, removes "of" from the NLR and recurses on a substring that is between the matched "of" string to a next match to an end of the integral "wrt" (with respect to), resulting in NLR 816.

Processing of NLR 816 begins in current state: expression. The beginning of NLR portion 816 is matched with an expression state specific mapping that maps the word "log(" to a log state. The system, upon making this match, removes "log(" from the NLR, and selects the substring between "log(" and closing parenthesis ")", resulting in NLR 818. In this case, moving from to the expression state produced no state results.

Processing of NLR 818 begins in current state: log. Upon initializing the log state, state results for "log" are produced. For example, the state results could be "<span class='logarithm'>". Another example is an XML block "<expression type='logarithm'>log(". The beginning of NLR 818, i.e. "(" is matched to a transition mapping of expression, with NLR portion 820 "x". An illustration of data resulting from processing of NLR portion 820 is excluded for conciseness, except for the eventual result of "x" being produced, returning to the parent expression state, then to the parent log state. Upon exiting the log state, the results of the log state, which now include the portion created upon entering the log state combined, at 832 and 834, with the results of the expression state: "<span class='logarithm'>(x)". and upon exiting the log state which can then be updated to include a closing tag "</span>", such that the final result from the log state is, in one example, "<span class='logarithm'>(x)</span>". At this point, NLR 816 that existed upon entering the parent expression state has been consumed to the point of being NLR 821 "/y".

Upon returning to the parent expression state, the remaining NLR portion 821, is processed. Returning to the expression state does not produce any new state results. The beginning of NLR portion 821 is matched with an "divide" state specific mapping that maps character "/" to a divide state. The system, upon making this match, removes "/" from the NLR and recurses on a substring that is between the matched "/" string to an end of the expression, which is the end of NLR 821. An illustration of data resulting from processing of NLR portion 822 is excluded for conciseness, except for the eventual result of $\overline{y}$ (which could be represented as "<span class='denominator'>y</span>") being produced. At 836 and 838, the results of the parent expression state can be determined, e.g. by combining "<span class='logarithm'>(x)</span>" with "<span class='denominator'>y</span>". In some implementations, divide can be a special case where combining includes more than concatenation and includes modification of the parent expression results, such as to wrap the sibling results in a "numerator" tag and wrapping both in a division tag. For example, the results of the expression that includes division can be: "<span class='division'><span class='numerator'><span class='logarithm'>(x)</span></span><span class='denominator'>y</span></span>". Upon making this combination, the expression state for the expression inside the integral exits, returning to the parent integral state. At this point, the remaining NLR portion 823 is "wrt x".

In some implementations, the actions performed when performing state start actions (e.g. at block 608) or the actions performed in the state end actions (e.g. at bock 612) can include modifications to state results for parent and/or sibling state results, as in the "divide" example above. As another example, state results from states arrived at through the "modifiers" global transition mappings can result in such parent or sibling result modifications. As a more specific example, when a "bar" state is encountered in the NLR (e.g. with the phrase "x bar") the "bar" state will modify the previous result "x" so that it has a bar over it.

Upon returning to the parent integral state, the remaining NLR portion 823, is processed. Returning to the integral state does not produce any new state results. The beginning of NLR portion 823 is matched with an "integral end" state specific mapping that maps the characters "wrt", when in the integral state, to an integral ending state. The system, upon making this match, removes "wrt" from the NLR and recurses on a substring that is between the matched "wrt" string to end of the integral notation, resulting in NLR 824.

Processing of NLR 824 begins in current state: integral end. Moving from the integral state to the integral ends state produces a result of "d" concatenated with either a variable specified in the received NLR portion, or with a variable determined to be primary (e.g. the only variable used, used most often, or is alphabetically first) in an expression body of the integral. In this case, the variable "x" is specified in the NLR portion, thus the results of the integral end state is "dx". The integral end state is configured to only have a mapping that returns to the parent integral state.

Upon returning to the parent integral state, the NLR 806 has been fully consumed and each of the states initiated matched to substrings of NLR 806 have returned results. In response, at steps 827, 828, 830, 840, and 842, these results are combined to create content that is rendered as formula 846. For example, this output can be the following block of HTML: "<span class='integral'><span class='integralLowerBound'>0</span><span class='integralUpperBound'>∞</span><span class='division'><span class='numerator'><span class='logarithm'>(x)</span></span><span class='denominator'>y</span></span></span>". Remaining actions portions that may be performed, e.g. upon exiting the expression state corresponding to NLR portion 804 or upon reaching the end of the original input NLR 802 are excluded from example 800.

Figure 9:
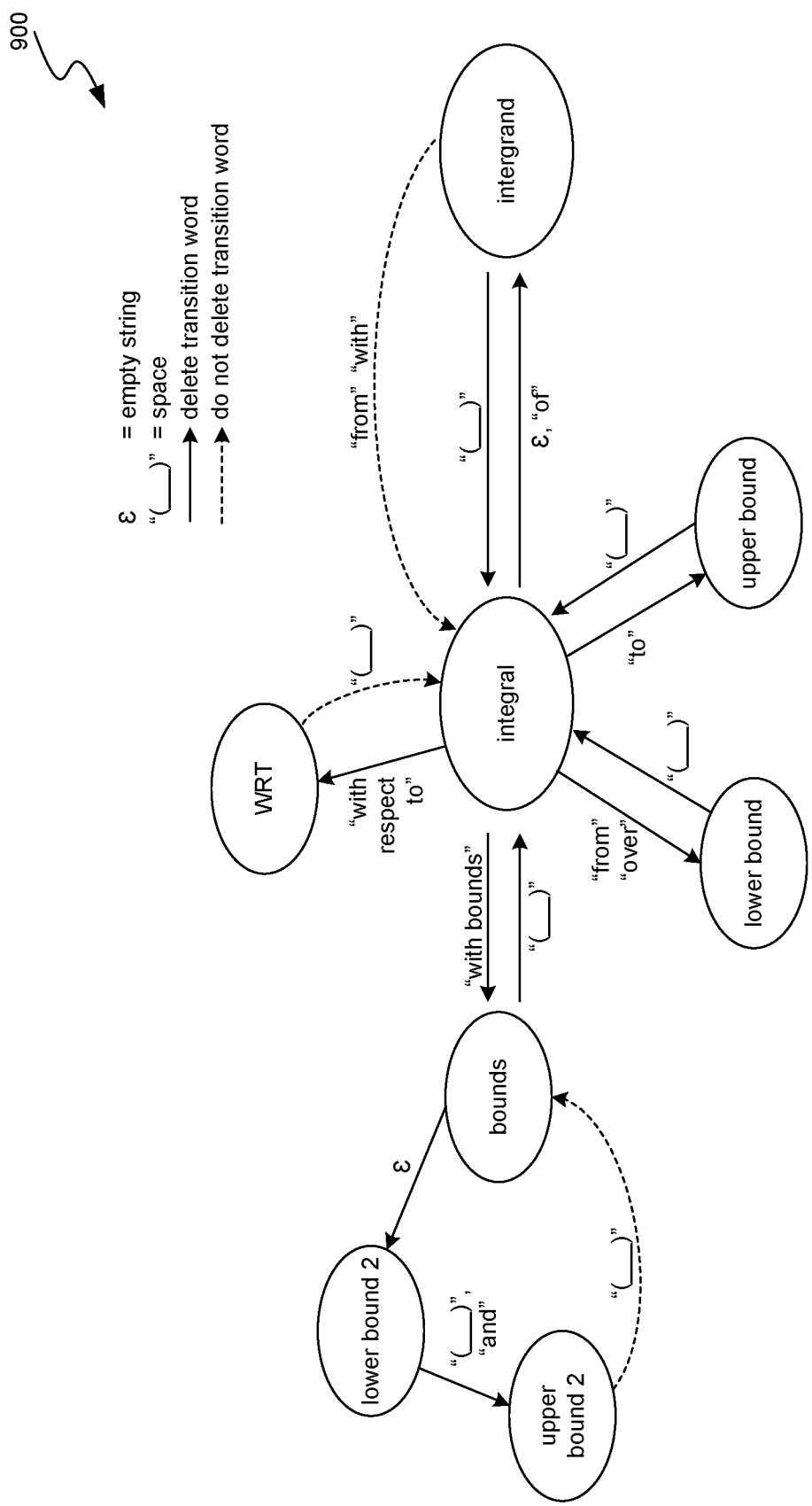
FIG. 9 is a conceptual diagram illustrating an example of a portion of a state machine showing transitions between states in relation to text describing an integral formula.

FIG. 9 is a conceptual diagram illustrating an example 900 of a portion of a state machine showing transitions between states in relation to text describing an integral formula.

Figure 10:
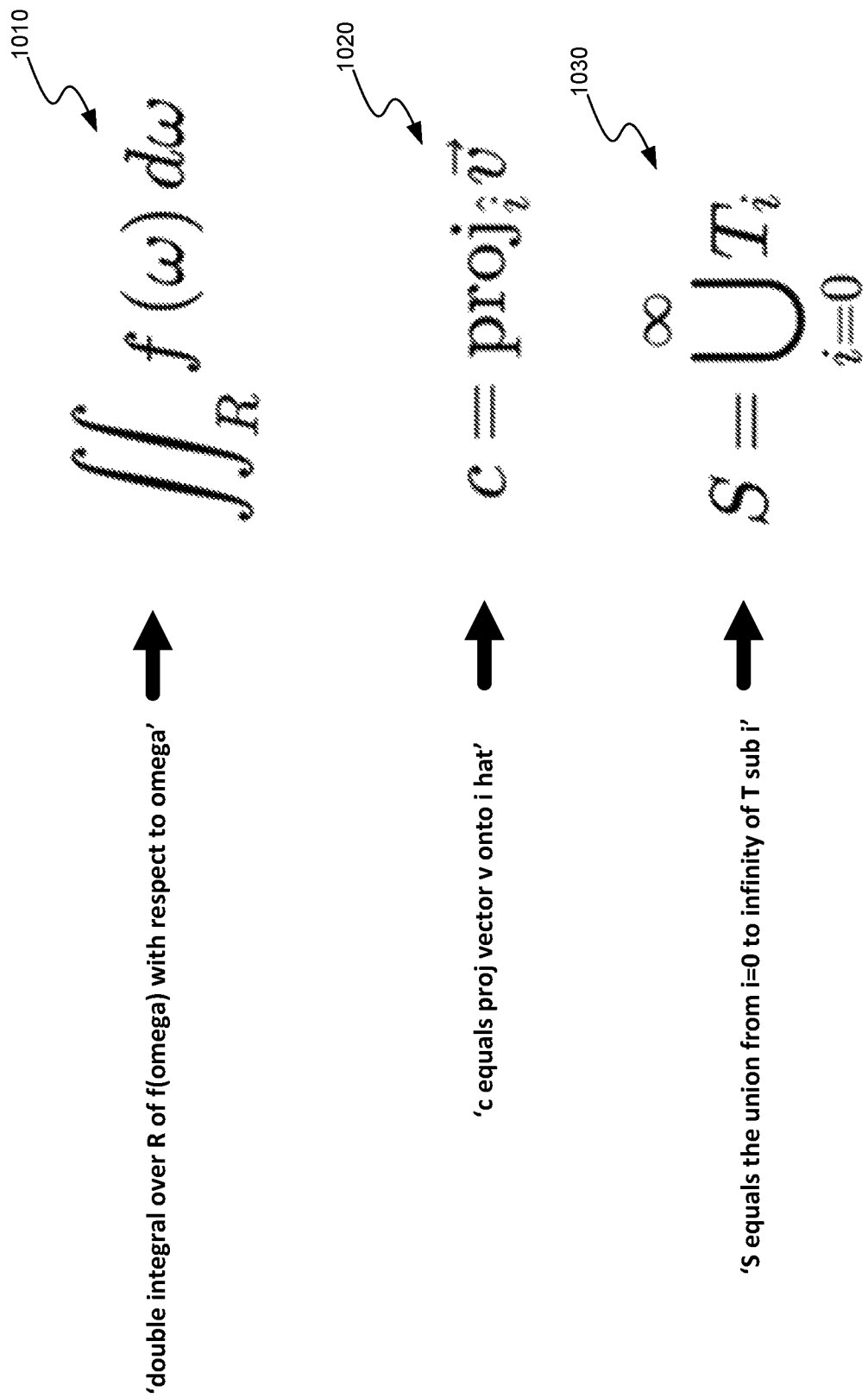
FIG. 10 shows several conceptual diagrams illustrating examples of textual NLR input and resulting formula representation outputs.

FIG. 10 shows several conceptual diagrams illustrating examples 1010, 1020, and 1030, showing textual NLR inputs and resulting formula representation outputs.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology.

In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for transforming a natural language representation of a formula into a formula representation, the method comprising:
receiving the natural language representation of the formula;
initializing a state machine;
consuming multiple parts of the natural language representation of the formula, until the natural language representation of the formula has been fully consumed, wherein consuming a particular part of the natural language representation is performed by transitioning from a current state to a next state, including:
matching the particular part of the natural language representation of the formula to a language pattern included in a matched transition mapping of at least three transition mappings that lead from the current state to possible next states,
wherein each of the at least three transition mappings include a different language pattern to which parts of the natural language representation can be matched; and
wherein the matching of the particular part to the language pattern is performed by:
comparing A) the particular part to B) patterns in a state specific set of multiple transition mappings that are specific to the current state of the state machine, in a first order defined among the state specific set of multiple transition mappings;
determining that none gf the state specific set of multiple transition mappings match the particular part;
in response to the determining, comparing C) the particular part to D) patterns in a global set of multiple transition mappings that are global to multiple states of the state machine such that they can be used to transition away from any of the multiple states of the state machine for which the multiple transition mappings are global;
identifying that none of the global set of multiple transition mappings match the particular part; and
in response to the identifying,
modifying the particular part of the natural language representation of the formula by removing one or more characters from the beginning of the particular part of the natural language representation of the formula; and
comparing E) the modified particular part to either or both of F) the patterns in the global set of multiple transition mappings or G) the patterns in the state specific set of multiple transition mappings;
based on the matched transition mapping corresponding to the next state, instantiating the next state; and
storing state results of the next state;
wherein at least two states are reached, during the consuming of the multiple parts of the natural language representation of the formula, that produce state results that are stored; and
combining the stored state results of the at least two states Into the formula representation which, when rendered, displays the formula in mathematical notation.

2. The method of claim 1 further comprising, in response to instantiating the next state corresponding to the matched transition mapping:
recursively transforming a portion of the natural language representation of the formula into a sub-formula representation that, when rendered, displays part of the formula in mathematical notation,
wherein the recursive transformation consumes the portion of the natural language representation; and
wherein the sub-formula representation is at least part of the state results of the next state.

3. The method of claim 1, wherein the instantiating the next state includes generating a first part of the state results of the next state;
wherein processing that occurs for the next state, for the particular part of the natural language representation while in the next state, produces a second part of the state results of the next state; and
wherein a third part of the state results of the next state is generated by performing state end actions taken in response to an indication that the next state is about to end.

4. The method of claim 1,
wherein the formula representation is a block of HTML code or XML code; and
wherein the formula representation is associated with CSS specifying how the rendering of the HTML or XML block is to occur.

5. The method of claim 1 wherein the matching the particular part of the natural language representation of the formula to the language pattern included in the matched transition mapping is performed by:
comparing A) an initial section of the particular part to B) patterns of multiple transition mappings, until the language pattern included in the matched transition mapping matches the initial section of the particular part, wherein at least some of the patterns in the multiple transition mappings are regular expressions.

6. The method of claim 1 wherein the matching of the particular part of the natural language representation of the formula to the language pattern included in the matched transition mapping is performed by comparing A) the particular part to B) patterns in a set of multiple transition mappings that are global to multiple states of the state machine such that they can be used to transition away from any of the multiple states of the state machine for which the multiple transition mappings are global.

7. The method of claim 1 wherein the matching of the particular part of the natural language representation of the formula to the language pattern included in the matched transition mapping is performed by comparing A) the particular part to B) patterns in a set of multiple transition mappings that are specific to the current state of the state machine.

8. The method of claim 1 further comprising producing at least part of the state results of the next state by filling in a template, that is associated with the next state, with content extracted from the particular part of the natural language representation of the formula.

9. A non-transitory computer-readable storage medium storing instructions that, when executed by a computing system, cause the computing system to perform operations for transforming a natural language representation of a formula into a formula representation, the operations comprising:
receiving the natural language representation of the formula;

operating a state machine to consume multiple parts of the natural language representation of the formula, wherein consuming a particular part of the multiple parts is performed by transitioning from a current state to a next state, including:
matching the particular part of the natural language representation of the formula to a language pattern included in a matched transition mapping of at least three transition mappings, that lead from the current state to possible next states, wherein each of the at least three transition mappings include a different language pattern to which parts of the natural language representation can be matched;
based on the matched transition mapping corresponding to the next state, instantiating the next state,
wherein the instantiating the next state includes generating a first part of state results of the next state;
wherein processing that occurs for the next state, for the particular part of the natural language representation, produces a second part of the state results of the next state; and
wherein a third part of the state results of the next state is generated by performing state end actions taken in response to an indication that the next state is about to end; and
storing the state results of the next state;
wherein at least two states are reached, during the consuming of the multiple parts of the natural language representation of the formula, that produce state results that are stored; and
combining the stored state results of the at least two states into the formula representation which, when rendered, displays the formula in mathematical notation.

10. The computer-readable storage medium of claim 9, wherein the operations further comprise, in response to instantiating the next state corresponding to the matched transition mapping:
recursively transforming a portion of the natural language representation of the formula into a sub-formula representation that, when rendered, displays part of the formula in mathematical notation,
wherein the recursive transformation consumes the portion of the natural language representation; and
wherein the sub-formula representation is at least part of the state results of the next state.

11. The computer-readable storage medium of claim 9, wherein the matching of the particular part of the natural language representation of the formula to the language pattern included in the matched transition mapping is performed by comparing A) the particular part to B) patterns in a set of multiple transition mappings that are global to multiple states of the state machine such that they can be used to transition away from any of the multiple states of the state machine for which the multiple transition mappings are global.

12. The computer-readable storage medium of claim 9, wherein the matching of the particular part of the natural language representation of the formula to the language pattern included in the matched transition mapping is performed by comparing A) the particular part to B) patterns in a set of multiple transition mappings that are specific to the current state.

13. The computer-readable storage medium of claim 9, wherein the matching of the particular part of the natural language representation of the formula to the language pattern included in the matched transition mapping is performed by:
first comparing A) the particular part to B) patterns in a state specific set of multiple transition mappings that are specific to a type of the current state of the state machine;
determining that none of the state specific set of multiple transition mappings match the particular part; and
in response to the determining, comparing C) the particular part to D) patterns in a global set of multiple transition mappings that are global to multiple states of the state machine such that they can be used to transition away from any of the multiple states of the state machine for which the multiple transition mappings are global.

14. The computer-readable storage medium of claim 13, wherein the operations further comprise:
identifying that none of the global set of multiple transition mappings match the particular part; and
in response to the identifying,
modifying the particular part of the natural language representation of the formula by removing one or more characters from the beginning of the particular part of the natural language representation of the formula; and
comparing E) the modified particular part to either or both of F) the patterns in the global set of multiple transition mappings; or G) the patterns in the state specific set of multiple transition mappings.

15. A computing system for transforming a natural language representation of a formula into a formula representation, the system comprising:
one or more processors; and
a memory storing instructions that, when executed by the one or more processors, cause the computing system to perform operations comprising:
operating a state machine to consume multiple parts of the natural language representation of the formula, wherein consuming a particular part of the multiple parts is performed by transitioning from a current state to a next state, including:
matching the particular part of the natural language representation of the formula to a language pattern included in a matched transition mapping of at least three transition mappings, that lead from the current state to possible next states, wherein each of the at least three transition mappings include a different language pattern to which parts of the natural language representation can be matched;
based on the matched transition mapping corresponding to the next state, instantiating the next state,
wherein the instantiating the next state includes generating a first part of state results of the next state;
wherein processing that occurs for the next state, for the particular part of the natural language representation, produces a second part of the state results of the next state; and
wherein a third part of the state results of the next state is generated by performing state end actions taken in response to an indication that the next state is about to end; and
storing the state results of the next state;
wherein at least two states are reached, during the consuming of the multiple parts of the natural language representation of the formula, that produce stale results that are stored; and combining the stored state results of the at least two states into the formula representation which, when rendered, displays the formula in mathematical notation.

16. The system of claim 15, wherein the matching of the particular part of the natural language representation of the formula to the language pattern included in the matched transition mapping is performed by:

first comparing A) the particular part to B) patterns in a state specific set of multiple transition mappings that are specific to the current state of the state machine;

determining that none of the state specific set of multiple transition mappings match the particular part; and in response to the determining, comparing C) the particular part to D) patterns in a global set of multiple transition mappings that are global to multiple states of the state machine such that they can be used to transition away from any of the multiple states of the state machine for which the multiple transition mappings are global.

* * * * *